United States Patent [19]

Sedlmayr

[11] Patent Number: 4,786,139
[45] Date of Patent: Nov. 22, 1988

[54] OPTICAL FIBER LIGHT TRANSFER APPARATUS, METHOD AND APPARATUS FOR MAKING SAME

[75] Inventor: Steven R. Sedlmayr, Golden, Colo.

[73] Assignee: Advance Display Technologies, Inc., Golden, Colo.

[21] Appl. No.: 122,407

[22] Filed: Nov. 19, 1987

Related U.S. Application Data

[63] Continuation-in-part of Ser. No. 25,385, Mar. 12, 1987.

[51] Int. Cl.$^4$ .................... G02B 6/08; F21V 7/04
[52] U.S. Cl. ...................... 350/96.27; 350/96.10; 350/96.25; 350/96.28; 350/320; 362/32; 358/901; 156/158; 156/161; 156/163; 156/166
[58] Field of Search ............ 350/96.10, 96.27, 96.25, 350/96.28, 96.24, 96.26, 320; 362/32; 358/901; 156/60, 158, 160, 161, 163

[56] References Cited

U.S. PATENT DOCUMENTS

| | | | |
|---|---|---|---|
| 3,104,191 | 9/1963 | Hick, Jr. et al. | 350/96.25 |
| 3,141,105 | 7/1964 | Courtney-Pratt | 350/96.24 |
| 3,321,658 | 5/1967 | Courtney-Pratt | 350/96.24 |
| 3,473,872 | 10/1969 | Okamura | 350/96.25 |
| 3,498,864 | 3/1970 | Ogle | 350/96.27 |
| 3,644,922 | 2/1972 | James et al. | 350/96.24 |
| 3,815,986 | 6/1974 | Darbee | 350/96.24 X |
| 3,950,074 | 4/1976 | Tanaka | 350/96.25 X |
| 3,989,578 | 11/1976 | Hashimoto | 350/96.24 |
| 4,090,104 | 5/1978 | Vann et al. | 350/96.27 |
| 4,116,739 | 9/1978 | Glenn | 350/96.25 X |
| 4,173,391 | 11/1979 | Schure et al. | 350/96.25 |
| 4,208,096 | 6/1980 | Glenn, Jr. | 350/96.25 |
| 4,590,492 | 5/1986 | Meier | 350/96.24 |
| 4,598,975 | 7/1986 | Bussard et al. | 350/96.24 |
| 4,650,280 | 3/1987 | Sedlmayr | 350/96.27 |
| 4,737,215 | 4/1988 | Stoffels et al. | 156/166 |
| 4,743,089 | 5/1988 | Sakakibara et al. | 350/96.24 |

FOREIGN PATENT DOCUMENTS

| | | | |
|---|---|---|---|
| 54-23552 | 2/1979 | Japan | 350/96.25 |
| 56-83705 | 7/1981 | Japan | 350/96.24 |
| 58-14805 | 1/1983 | Japan | 350/96.25 |
| 59-170816 | 9/1984 | Japan | 350/96.25 |
| 59-224812 | 12/1984 | Japan | 350/96.27 |
| 61-223804 | 10/1986 | Japan | 350/96.24 |

Primary Examiner—William L. Sikes
Assistant Examiner—Brian M. Healy
Attorney, Agent, or Firm—Fields, Lewis, Pittenger & Rost

[57] ABSTRACT

Light transfer apparatus and method and apparatus for making disclosed includes a screen row clamping assembly that clamps a row of screen units side by side in a straight row with uniform spacing of fiber ribbons between units. A matrix row clamping assembly clamps a row of matrix units side by side in a straight row with uniform spacing of fiber ribbons between units. A pair of alignment rods connect screen units side by side and also connect to alignment ribs on the back of the screen units that interfit end to end and are joined by connecting channels. The alignment rods fasten to terminator bars secured to a screen frame and the ribs are also secured to the screen frame. The rows of matrix units are placed in a matrix frame in which they are held together in a square configuration with uniform spacing between and alignment of fiber ribbons. The matrix ends are cut to a planar surface by a band saw.

36 Claims, 10 Drawing Sheets

Fig_5

Fig_6

Fig_7

Fig_8

Fig_10

Fig_9

Fig_17

Fig_18

Fig_19

Fig_20

Fig_21

Fig_23

Fig_24

Fig_25

Fig_26

Fig_27

OPTICAL FIBER LIGHT TRANSFER APPARATUS, METHOD AND APPARATUS FOR MAKING SAME

This application is a continuation-in-part of application Ser. No. 025,385 filed Mar. 12, 1987.

TECHNICAL FIELD

This invention relates to novel and improved light transfer apparatus and method and apparatus for making same.

BACKGROUND ART

In U.S. Pat. No. 4,650,280 a copending application entitled Method and Apparatus for Making Light Transfer Devices and the parent application entitled Fiber Optic Light Transfer Assemblies and Devices there is disclosed a plurality of optical fibers extending between a screen and a matrix. The optical fibers are specifically arranged to transfer light in such a way as to produce enlarged images.

DISCLOSURE OF THE INVENTION

Light transfer apparatus disclosed includes a plurality of bundles of optical fibers between a screen and a matrix. The screen units are connected side by side in an aligned row in a screen clamping assembly using an adhesive between contacting surfaces. An alignment rib is connected between adjacent ribs and a pair of alignment rods extend through the screen units and connect at the ends to terminator bars which in turn mount to a screen support frame for screen row alignment and support. The matrix units are connected side by side in an aligned row in a matrix clamping assembly using an adhesive between contacting surfaces. The rows of screen units are arranged one above the other and connected end to end to form aligned columns which in turn are connected to a screen frame. The alignment ribs have mating tongue and grooves when the rows are one above the other and connecting channels sense the ribs in vertical columns. Cables extend through the columns of ribs and attach at the ends to the screen frame. The rows of matrix units are placed in a matrix frame which positions and holds them in aligned columns and preferably a square configuration. The matrix frame is mounted to the rear of the screen frame and a cut is made across the ends of the matrix unit as with a band saw.

DETAILED DESCRIPTION

Referring now to FIGS. 1-4 there is shown light transfer apparatus 12 which, in general, is comprised of a plurality of bundles 13 of optical fibers extending between a screen S and a matrix M. One application for this apparatus is to enlarge images. A projector 16 is shown in dashed lines in FIG. 2 that projects an image onto the end surface 15 of the matrix M which is enlarged and appears for viewing on an end surface 14 of the screen S.

The screen S is comprised of a plurality of screen units 21 arranged side by side in an aligned row and arranged vertically in aligned columns. The matrix M includes a plurality of matrix units 22 arranged side by side in an aligned row and arranged vertically in aligned columns.

Figures 1, 2, 3, 4:
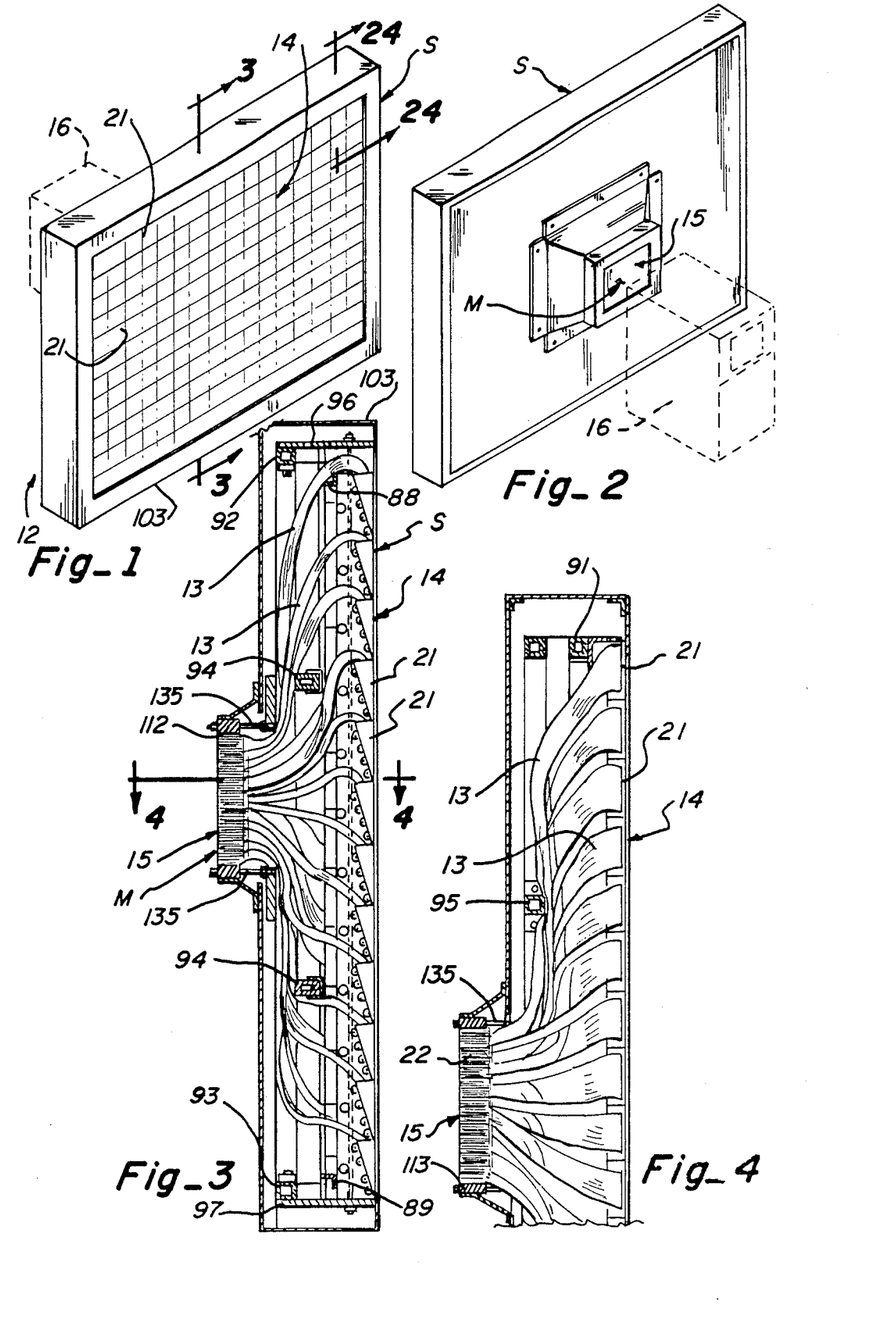
FIG. 1 is a front perspective view of light transfer apparatus embodying features of the present invention.
FIG. 2 is a rear perspective view of the apparatus shown in FIG. 1.
FIG. 3 is a sectional view taken along lines 3—3 of FIG. 1.
FIG. 4 is a sectional view taken along lines 4—4 of FIG. 3.
Figure 5:
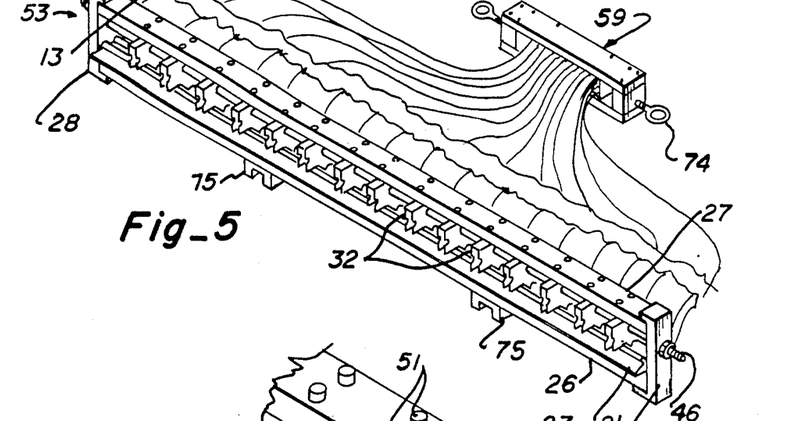
FIG. 5 is a perspective view of a row of screen units held by a row clamping assembly and a row of matrix units held in a row clamping assembly.
Figure 6:
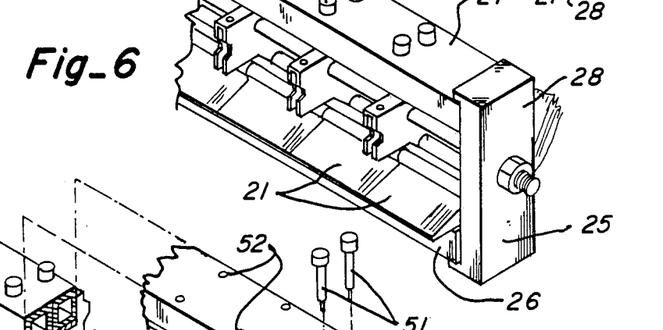
FIG. 6 is an enlarged fragmentary perspective view of one end portion of one row of clamped screen units shown in FIG. 5.
Figure 7:
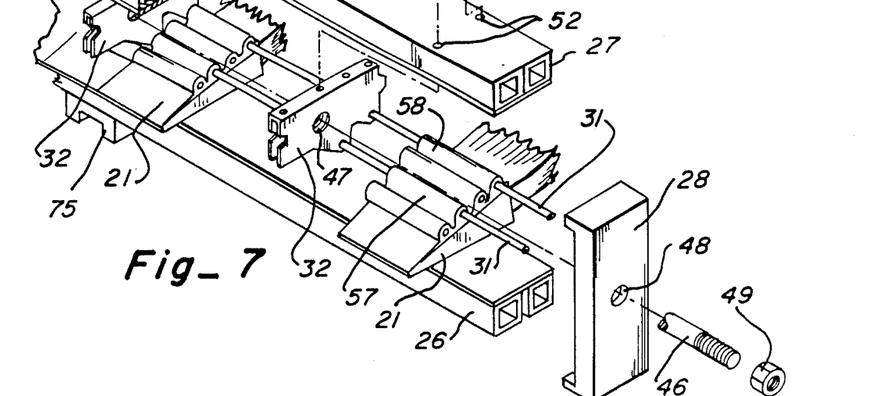
FIG. 7 is an exploded view of the clamped screen units shown in FIG. 6.

In the making of a straight row of aligned screen units, a row clamping assembly 25 is employed. Clamping assembly 25 includes a bottom row clamp 26, a top row clamp 27 and a pair of end row clamps 28 arranged in an oblong frame configuration to provide a preselected dimension between the end clamps. Each end row clamp has a pair of inturned flanges 29 that hold the top and bottom row clamps a selected distance apart. The top surface of the bottom row clamp 26 is waxed and preferably, a sheet of contact paper is applied to the diagonal or tapered end surface 30 of each screen unit to prevent these surfaces from sticking to one another. A plurality of the screen units 21 are laid with end surfaces 30 face down in a row on the bottom row clamp 26 with an alignment rib 32 being disposed between abutting screen units.

Each alignment rib 32 is a relatively thin body having a U-shaped cross section, preferably made of sheet metal, including a top end portion 33 from which extend two parallel spaced leg portions 34. As viewed from the side, both leg projections 34 have a bottom edge 35 extending parallel to top end portion 33 and a longer centrally disposed projection 37 and a second projection 38 adjacent the bottom end that extend below bottom edge 35 forming a notch 40 therebetween. Each projection 37 and 38 has a transverse hole 45 through which an alignment rod 31 extends so the two rods 31 extend parallel to one another and connect the screen units in aligned rows. The lower edges of the projections 37 and 38 are tapered to conform to the taper of the back of the screen with top end portion 33 parallel to the end surface 30 of the unit.

Figures 9, 10:
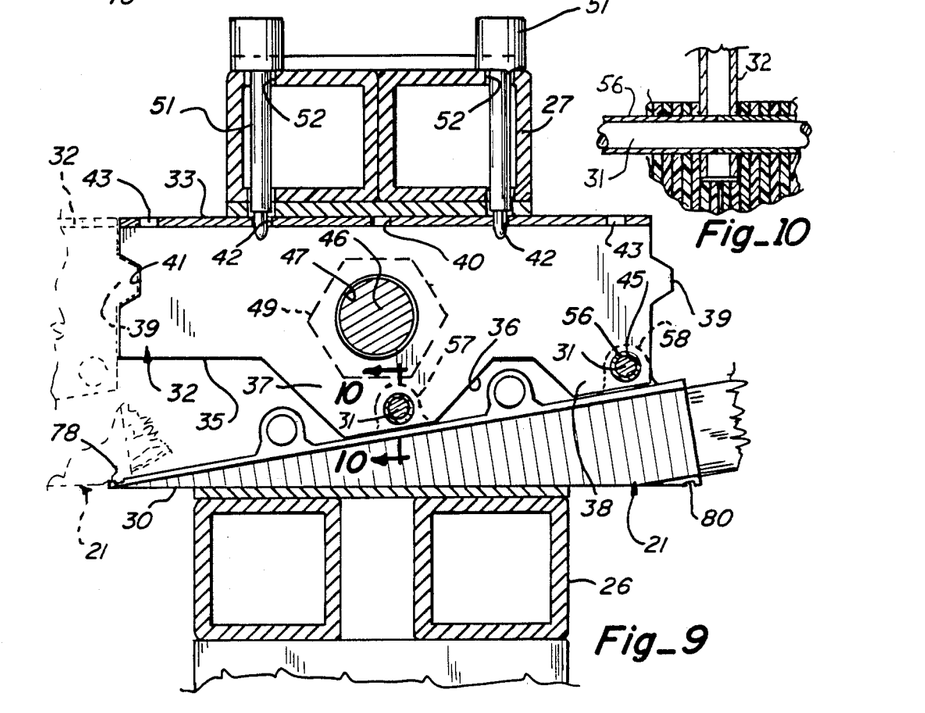
FIG. 9 is a sectional view taken along lines 9—9 of FIG. 8.
FIG. 10 is a sectional view taken along lines 10—10 of FIG. 9.

As best seen in FIG. 10, two of the raised ear portions of the two end locator elements are removed so that both end portions of the hollow metal tube 56 extending through the screen unit will slide into the hole 45 in the rib projection 37 and 38 to locate and support the ribs between adjacent screen units. In particular, a hollow metal tube 56 extends through a central raised ear portion 57 and a hollow metal tube 56 extends through a bottom end raised ear portion 58 of the screen unit 21. The alignment rod 31 extends through adjacent metal tubes of abutting screen units.

Rib 32 has a tapered tongue 39 on each leg section along the bottom end and a tapered groove 41 on each leg section along the top end which serve as male and female coupling means and interfit when two ribs are positioned end to end. Each top end portion 33 is provided with a center hole 40, two spaced intermediate holes 42, and two end holes 43. Prior to assembly, an adhesive is applied to the contacting surfaces of the adjacent screen units. In particular, each screen unit along the adjacent abutting sides has a projecting portion and a recessed ribbon along one side and a stepped-in portion and a raised spacer portion along the other side (FIG. 9) which are complementary so as to interfit or nest when two units are placed side by side. Each screen unit further has a projection in the stepped-in portion at the bottom of one unit that extends into a notch in the projection of the adjacent screen unit for interfitting and alignment purposes.

Figure 8:
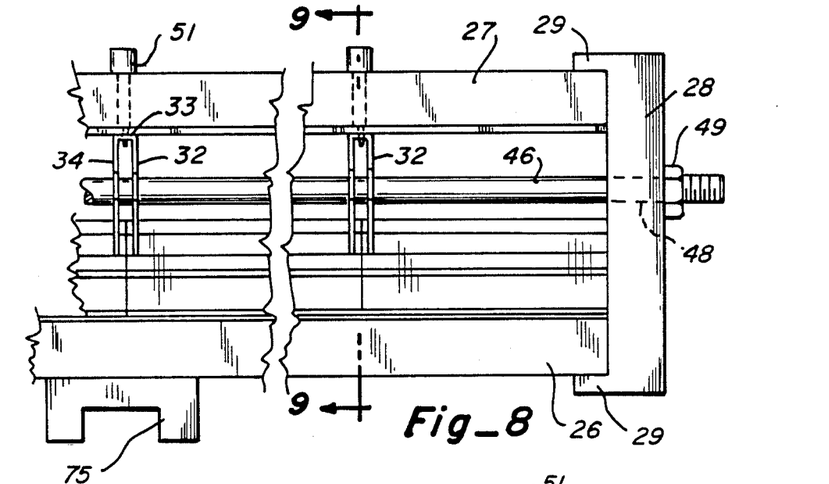
FIG. 8 is an elevational view of the end portion of one row of clamped screen units shown in FIG. 6.

The top row clamp 27 is positioned on top of the ribs. A clamping rod 46 extends through a transverse hole 47 in each of the ribs and through holes 48 in the pairs of end row clamps. The top and bottom row clamps and the end clamps are temporary structure for assembling and aligning a row of the screen units. A nut 49 is tightened at each end to clamp the clamping assembly together and draw the screen units to the correct length dimension. Two pins 51 with heads are placed into holes 52 in the top row clamp and holes 42 in the ribs. The two holes 52 are a preselected distance apart along the top row clamp and are in two straight rows to provide an initial alignment of the screen units one with another in a straight row prior to clamping by tightening the nuts on clamping rod 46. This forms a clamped screen row assembly 53. The adhesive is allowed to dry as by air drying or could be cured in an oven. This clamping arrangement for the screen unit provides uniform spacing of the fiber ribbons between screen units to avoid gaps in the display surface. This arrangement provides for an array of the fibers that are aligned both vertically and horizontally and there is equal space between the fiber ribbons of adjacent screen units.

Figures 11, 12, 13, 14:
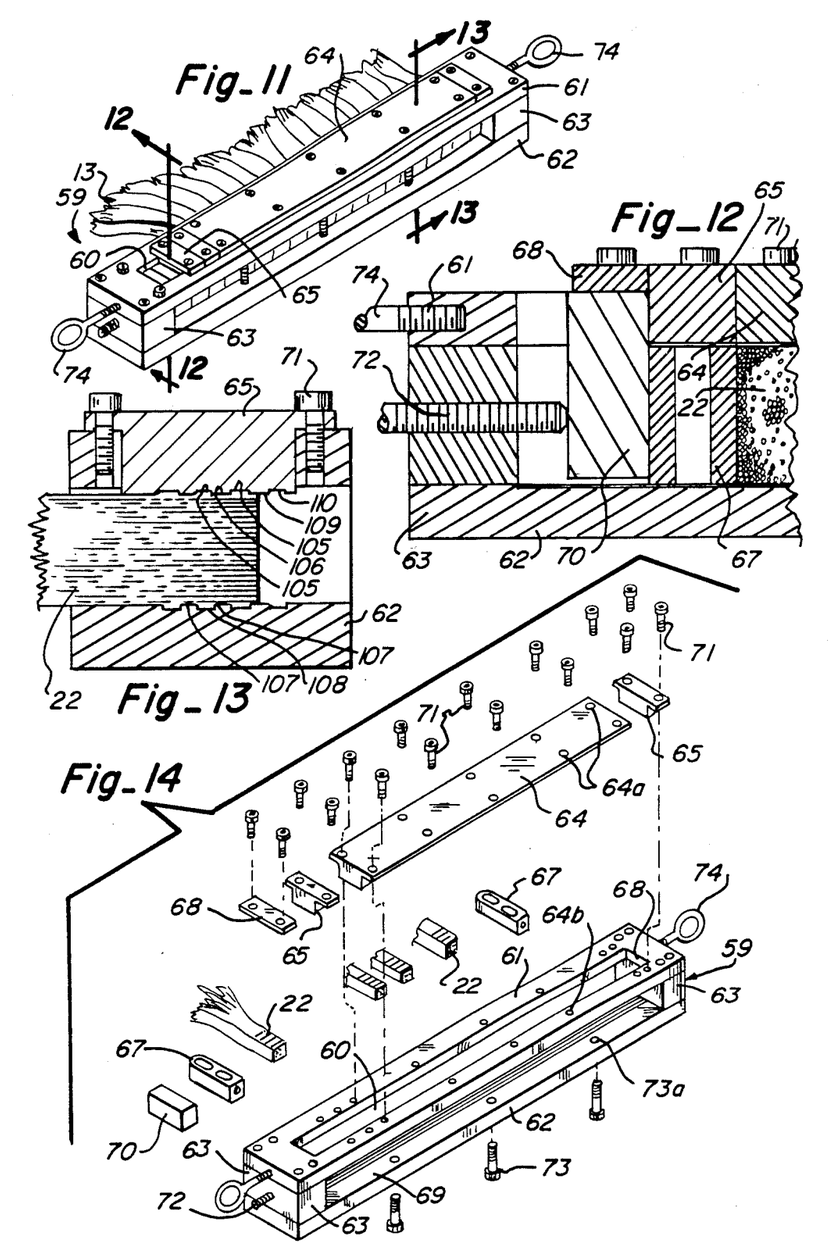
FIG. 11 is a perspective view of a row of matrix units in a row clamping assembly.
FIG. 12 is a sectional view taken along lines 12—12 of FIG. 11.
FIG. 13 is a sectional view taken along lines 13—13 of FIG. 11.
FIG. 14 is an exploded view of a matrix clamping assembly shown in FIG. 11.

Each matrix unit 22 includes parallel spaced fiber ribbon columns with a separator in the form of a thin sheet between the fiber ribbon columns along the terminating left side with no separator on the right side as is described in the parent application. As seen in FIG. 13, a series of alternating top ridges 105 and top grooves 106 extend laterally across the top of the end portion of the matrix unit. A similarly shaped series of alternating bottom ridges 107 and bottom grooves 108 extend laterally across the bottom of the end portion of the matrix unit. These ridges preferably are formed of an adhesive that bonds the separators and ribbons together.

Referring now to FIGS. 11-14, there is shown a matrix row clamp assembly 59 including the top plate 61 having a top slot 60, bottom plate 62 and a pair of end spacer blocks 63 between the top and bottom plates at the end thereof so as to form an internal space with openings 69 in opposite sides. The internal space is of an oblong or rectangular configuration and is of a preselected length dimension for each row of matrix units. There is further provided a long T-block 64 and two short T-blocks 65 and a pair of end caps 67 and a top cap 68. Each end cap 67 is provided with two elongated vertical holes 67a. The T-blocks have a series of alternating bottom ridges 109 and grooves 110 that mate with the matrix unit grooves and ridges for alignment and positioning purposes of the matrix unit during assembly into rows. The bottom plate 62 has a series of alternating top ridges and grooves in the top surface similar to those of T-block 65 that mate with the matrix unit grooves and ridges along the bottom thereof.

Every surface of the matrix row clamp assembly that contacts the matrix unit is waxed to prevent sticking thereto. An end cap 67 is inserted to the far right against the end spacer block 63 as viewed in FIG. 11 and the short T-block 65 is positioned in the top slot 60 above end cap 67. The long T-block 64 is then inserted into the top slot and the bolts 71 are inserted through holes 64a in the long T-block and threaded loosely into aligned holes 64b in top plate 64 and tightened but not fully tight. A first matrix unit 22 with an adhesive on the contacting surfaces is inserted into the end slot 69 and in place against the end cap 67 and under the short T-block 65 with the ridges and grooves mating as seen in FIG. 13. Succeeding matrix units 22 are inserted on the far left as seen in FIG. 11 and then slid over into place and the other end cap 67 is inserted in the space and the left side short T-block 65 is inserted in the slot over end cap 67. A clamping block 70 is inserted at the left end adjacent the left short T-block 65. A final clamping bolt 72 threads through an internally threaded in block 63 and bears against block 70 which in turn urges end cap 67 against matrix unit 22. Block 70 moves against short T-block 65 which establishes a final dimension position for the matrix unit row. The long T-block 64 is firmly fastened in place. Bottom bolts 73 are inserted which extend up through holes 73a in the bottom plate 63 to provide a final straight row of matrix units. The distance between the parallel spaced inside surface portions of the short T-blocks 65 is the criteria for whether or not the row of matrix units have been put into the correct position. An eye bolt 74 is threaded into the opposite ends of the top plate 61 to facilitate lifting thereof. The clamped matrix row assembly 59 is then cured in the same manner as the screen units, either by air drying in an ambient temperature or in a heating and a curing oven for faster heating. At this point, a clamped screen unit assembly 53 and clamped matrix unit assembly 59 have been formed which are best seen in FIG. 5.

Figure 15:
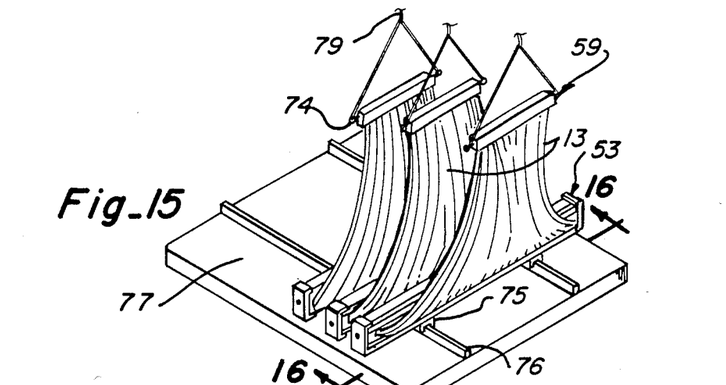
FIG. 15 is a perspective view showing a partial assembly of screen units in columns and the matrix units in an elevated position.
Figure 16:
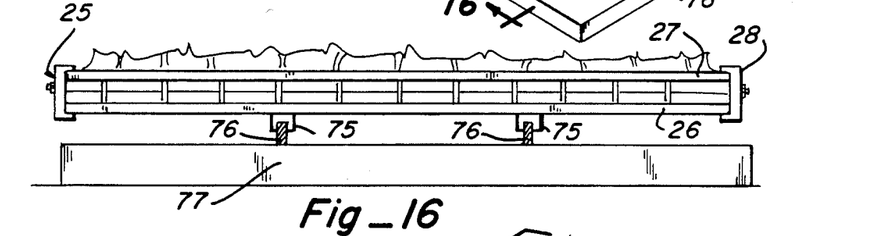
FIG. 16 is an end elevation view taken along lines 16—16 of FIG. 15.
Figure 17:
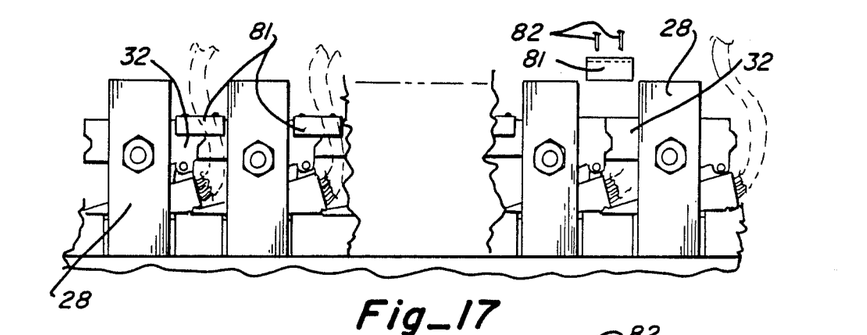
FIG. 17 is a fragmentary end elevational view showing the short channels being connected to the ribs to hold the screen units in straight columns with the row clamps still in place.
Figure 18:
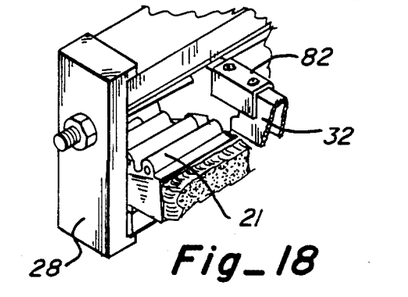
FIG. 18 is a fragmentary perspective view showing the short channels in connected place.
Figure 19:
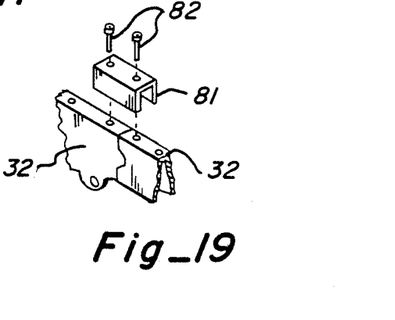
FIG. 19 is a fragmentary perspective view showing the short channel in a removed position.
Figure 20:
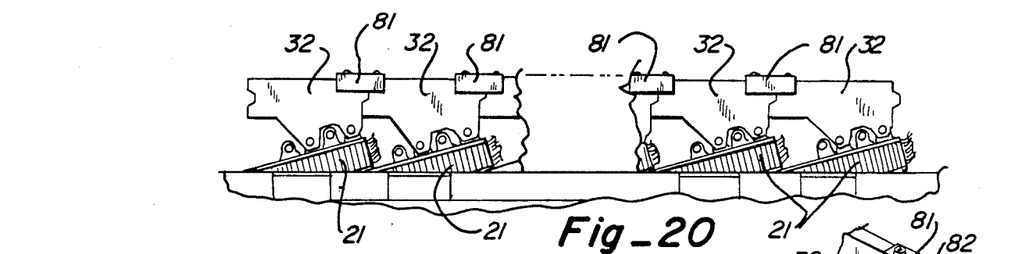
FIG. 20 is an end elevational view of the assembly shown in FIG. 16 with the top and end row clamps removed and with the bottom row clamp remaining to provide a supporting surface.

Each bottom row clamp 26 is further provided with a pair of laterally spaced inverted U-shaped guides 75 affixed to the underside thereof and which for purposes of assembly and alignment fit over a pair of parallel-spaced support rails 76 on a suitable support 77 as seen in FIGS. 15 and 16. The clamped screen unit assemblies 53 are stacked one above the other to form aligned columns of screen units. A top ridge 78 extends along the back surface at the top of each screen unit and a bottom groove 80 extends along the front surface at the bottom of each screen unit so that when two screen units are arranged end to end and overlapped in a column the top ridge of one fits in the bottom groove of the other which interconnects the screen units in columns. Preferably, an adhesive is used to physically connect these overlapping mating surfaces together.

The clamped matrix assemblies 59 preferably are suspended above the clamped screen units 53 using cables 79 that attach to eye bolts 74 as is illustrated in FIG. 15. Short alignment channels 81 with holes are positioned over the interfitting end portions of abutting outer ribs 32 at opposite ends thereof and these are held by rivets 82 that extend through the end holes 43 in the ribs 32. Long alignment channels 83 are positioned over the intermediate interfitting alignment ribs 32 of each column and are riveted thereto by rivets 82 so as to join the screen units top to bottom and provide aligned columns of screen units.

Figure 21:
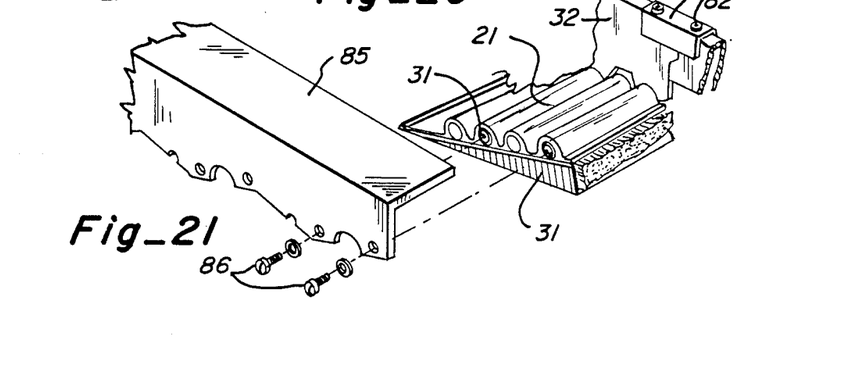
FIG. 21 is an exploded perspective view showing the fastening of the end screen unit to a terminator bar.
Figure 22:
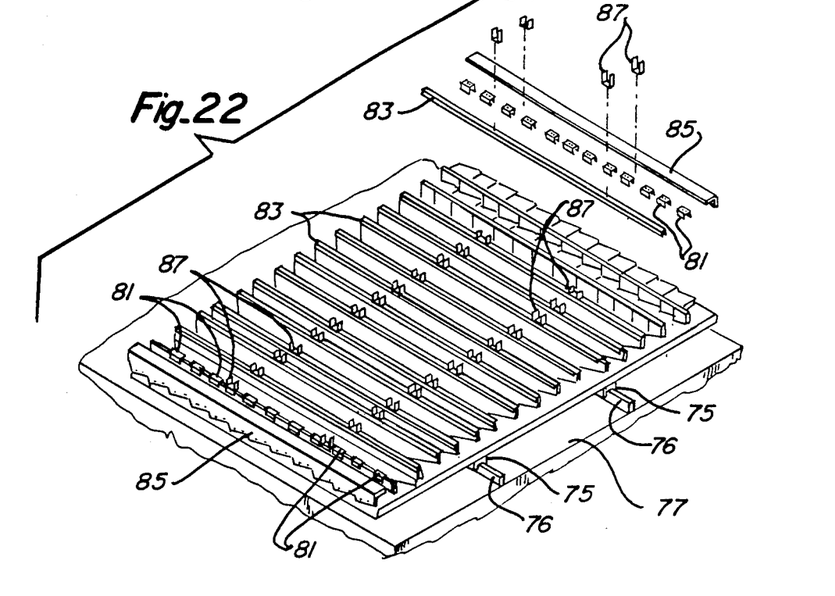
FIG. 22 is a rear perspective view showing the addition of long channels and terminator bars in both raised and connected positions.
Figures 23, 24:
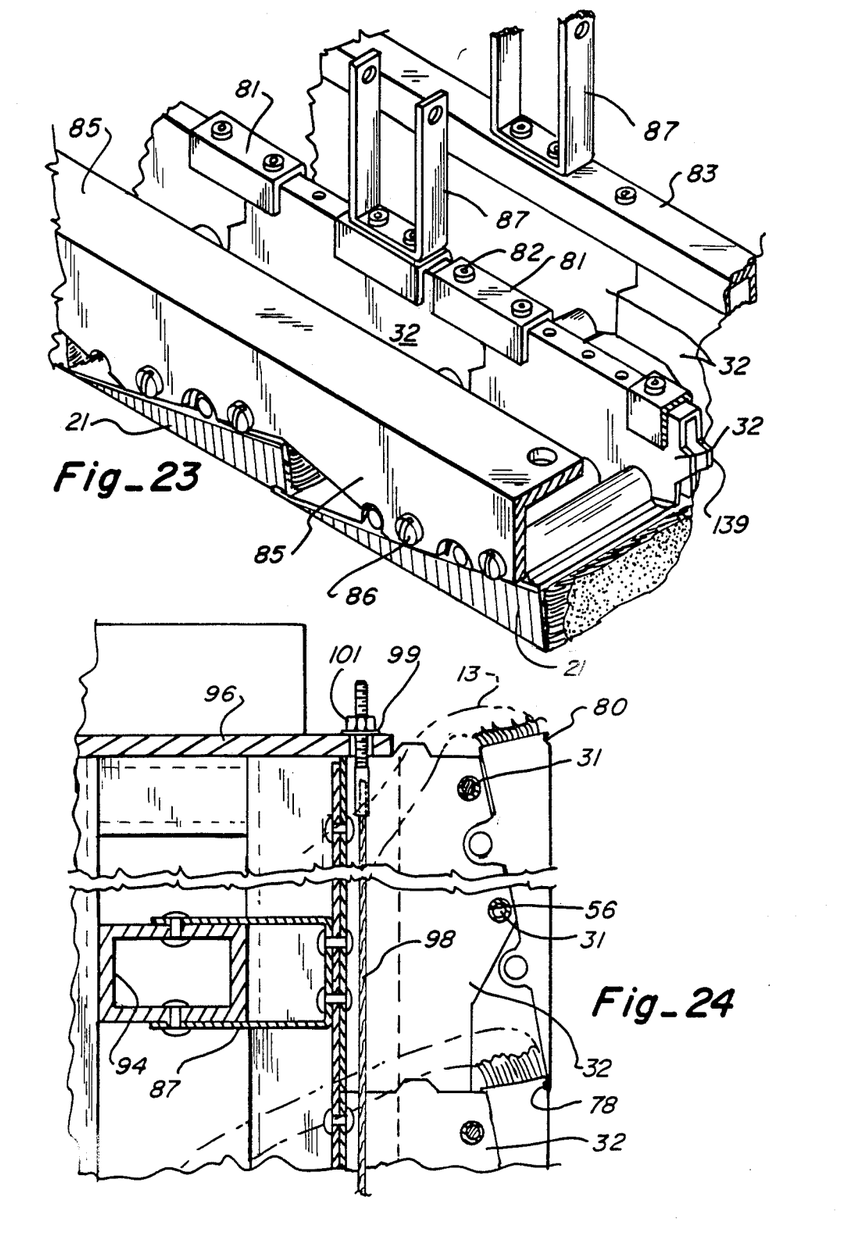
FIG. 23 is an enlarged fragmentary rear perspective view of the screen assembly shown in FIG. 22 with connecting brackets added.
FIG. 24 is a sectional view taken along lines 24—24 of FIG. 1.

Terminator bars 85 having a right angle cross section are connected at the opposite ends of the assembled rows of screen units by bolts 86 that extend through holes in bar 85 and thread into internal threads in the end of the alignment rods 31 (FIG. 21). Channel support brackets 87 are fastened to the rear of the support channels preferably by rivets 82 which in turn are later riveted to the screen frame (FIG. 24).

Before attaching the screen units to the screen frame, a horizontally disposed top connector member 88 (right angle section) is fastened across the top end portion of the assembled channels and ribs preferably by riveting. A bottom connector member 89 (right angle section) is fastened across the bottom end portion of the assembled channels and ribs preferably by riveting. These connector members are provided with holes that are preselected distances apart to maintain parallelism in the connected ribs from top to bottom.

Figures 25, 26, 27:
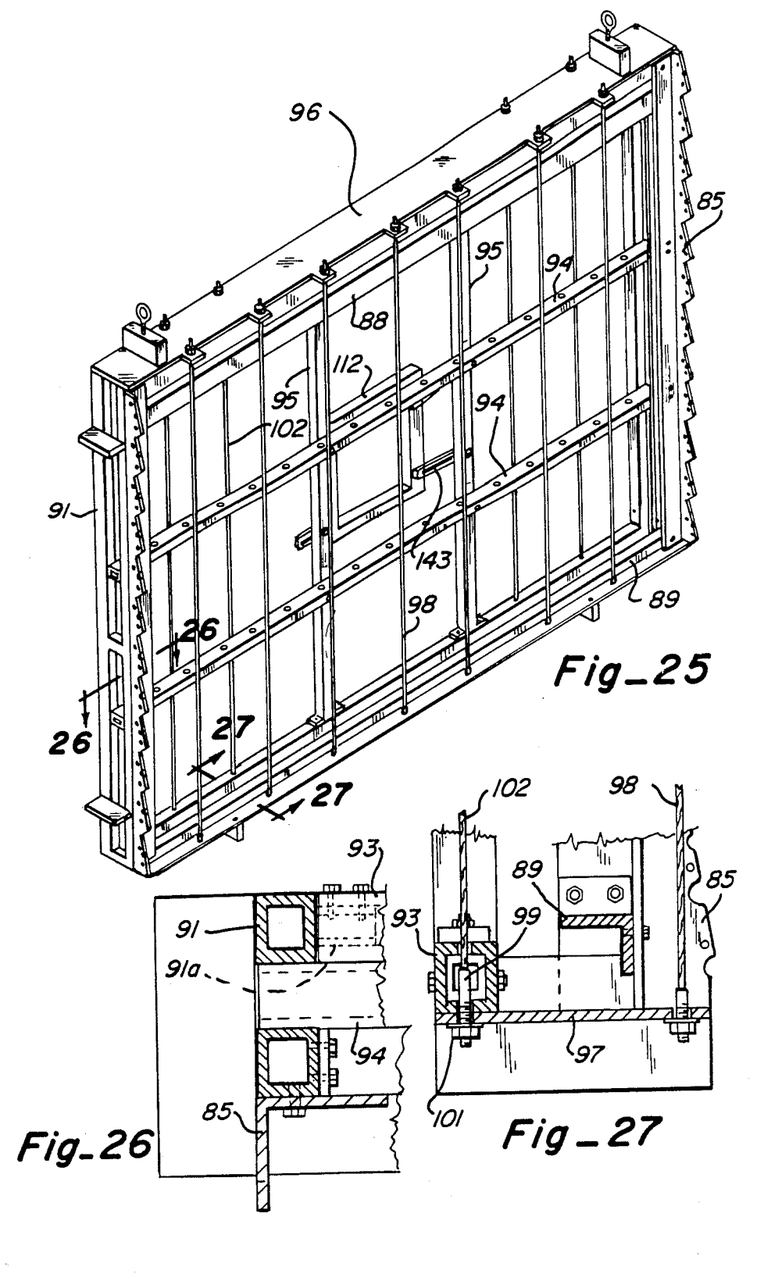
FIG. 25 is a front perspective view of the screen frame and matrix frame without the screen or matrix units in place.
FIG. 26 is a sectional view taken along lines 26—26 of FIG. 25.
FIG. 27 is a sectional view taken along lines 27—27 of FIG. 26.

A screen frame of oblong configuration is then added which includes spaced side frame members 91, a top horizontal frame member 92 and bottom horizontal frame members 93 which are simultaneously assembled into a rectangular configuration. The side frame members are comprised of two spaced tubular sections connected at the top and between the ends by short tubular sections. The oblong frame assembly is then fastened to the terminator bars 85 as by bolts. Each side frame member has a protrusion 91a that telescopes into the open end of the associated horizontal frame member in the assembly thereof. Two horizontal intermediate frame members 94 are fastened at the ends to the side frame members in spaced parallel relation to the top and bottom horizontal frame members. Two spaced upright frame members 95 with flanges at the end are secured to the top back horizontal frame members and bottom back horizontal frame members as by bolts. A top plate 96 is secured across the top to the top frame member 92 and a bottom plate 97 is secured across the bottom to the bottom frame member 93.

Front cables 98 extend through holes in protrusions in the top plate 96 and down between the spaced leg sections of the columns of ribs 32 and through holes in the bottom plate and are secured at the ends as by having a bolt 99 secured to the cable and a nut 101 threaded on the end.

Rear cables 102 extend through holes in the top and bottom plates and are fastened at the ends in the same way as the front cables for further frame strength and alignment. A final step involves mounting a suitable cover 103 around the screen frame.

A matrix frame 112 for the matrix units 22 includes shorter frame member 113 that is preferably secured to a support surface as by bolting and a pair of spaced longer frame members 114 that are connected across the ends of frame member 113 by long bolts 115 that extend into internally threaded holes in member 113.

Figures 28, 29, 30:
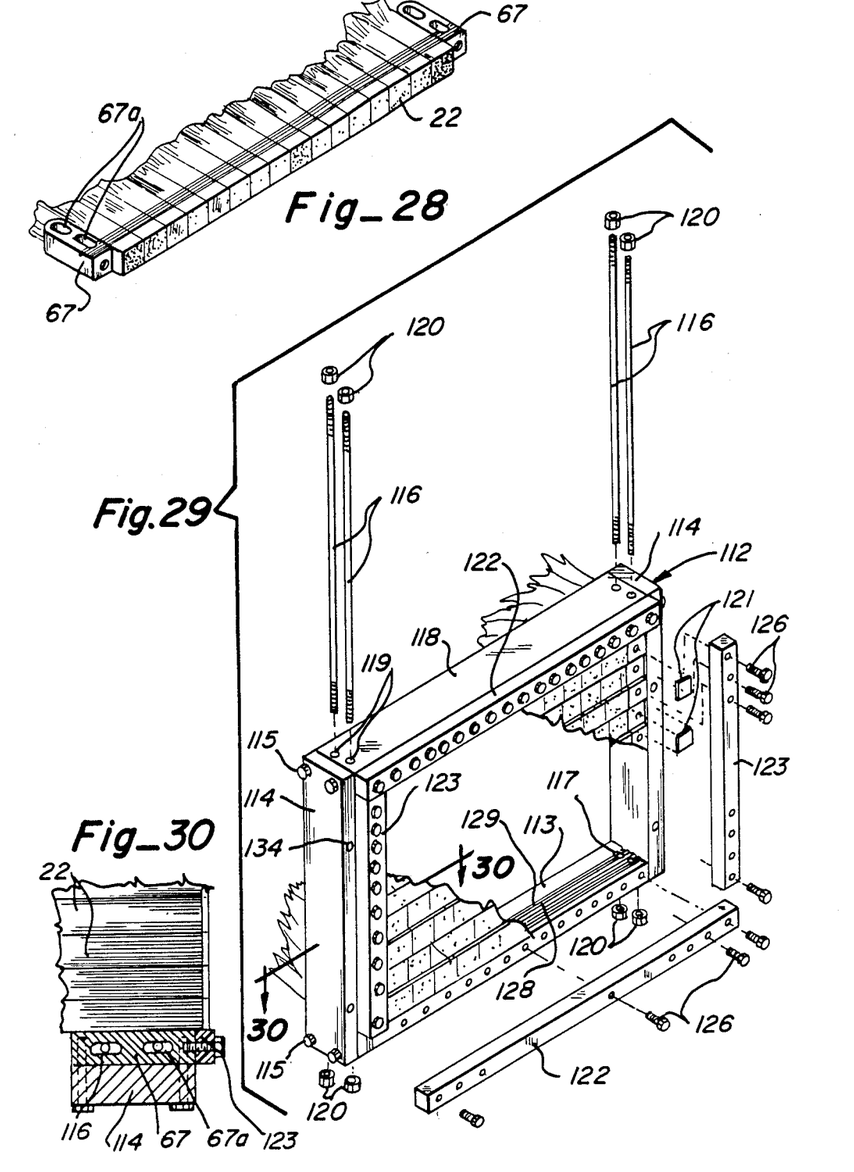
FIG. 28 is a perspective view of a connected row of matrix units with end caps.
FIG. 29 is a perspective view of the assembled matrix frame and matrix units prior to the end face cutting with several parts in a removed position.
FIG. 30 is a sectional view along lines 30—30 of FIG. 29.

Two sets of pairs of spaced guide rods 116 having threads on both ends are threaded into holes 117 in frame member 113 and extend up from the frame member 112 along and spaced from the pair of longer frame members 114. The wax is removed from the end caps and an adhesive is applied to the frame surfaces that are to contact the matrix units. A first connected matrix row with end caps 67 at the ends as shown in FIG. 28 is slid down over the two sets of pairs of rods 116. This is repeated to form the columns of matrix units and the final array of rows and columns of matrix units. A fourth short frame member 118 with holes 119 to receive the ends of rods 116 is installed and tightened down with nuts 120 threaded on rods 116. This provides a square configuration of connected matrix units. Opposed frame members 113 and member 118 are provided with alternating ridges 128 and grooves 129 which receive and mate with the top and bottom ridges of the matrix units. Aluminum spacers 121 are added to the recesses to form a flush surface.

Figures 31, 31A, 32, 33, 34:
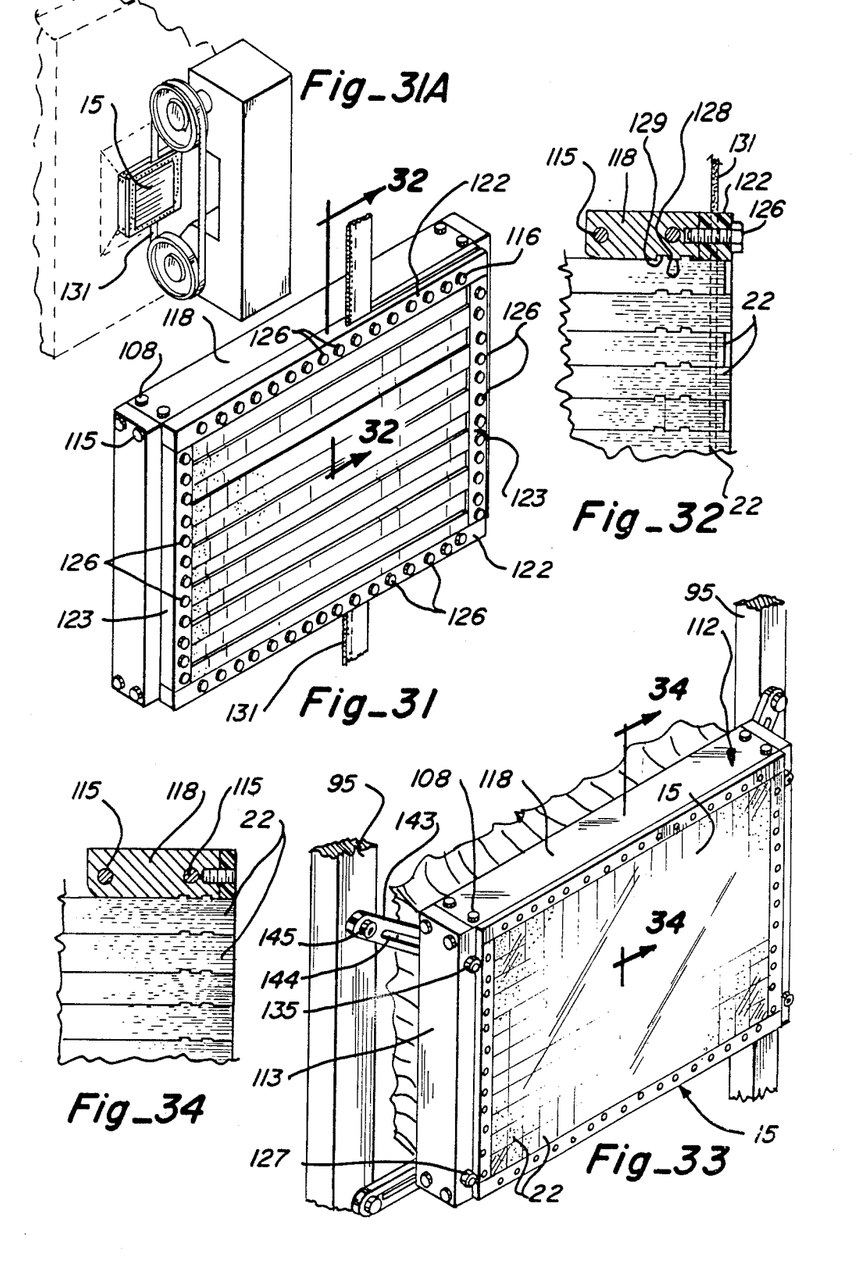
FIG. 31 is a perspective view of the matrix assembly with a saw cutting the end face.
FIG. 31A is a perspective view of the cutting saw used in FIG. 31.
FIG. 32 is a sectional view taken along lines 32—32 of FIG. 31.
FIG. 33 is a perspective view of the complete matrix assembly.
FIG. 34 is a sectional view taken along lines 34—34 of FIG. 33.

An auxiliary phenolic frame is added which preferably consists of two long frame members 122, and two shorter frame members 123. Each member has a-series of holes 123. Members 122 and 124 are made of fiberglass and with the use of nylon screws 126 is mounted on the face end to form a frame to protect the matrix ends from irregularities during cutting and also provide a cleaner cut for a cutter blade 131. The matrix frame 112 with embraced matrix units is removed from being fastened to the support and lifted and mounted o the screen frame. The matrix frame has holes 134 to receive four long externally threaded rods 135 extending through holes in intermediate upright members 95 of the screen frame. A brace 143 with an elongated slot 144 is bolted at one end by a bolt 145 to a frame member 95. The long rod 135 extends through the slot 144 and is bolted to block 143. This allows the matrix frame to be moved toward and away from the screen frame and fastened at a selected position. After the matrix frame is in place, a cut is made across the face of the matrix surface preferably by a band saw blade 131 as is illustrated in FIGS. 31 and 32 to form a flat or planar end surface 15 of the matrix M.

Although the present invention has been described with a certain degree of particularity, it is understood that the present disclosure has been made by way of example and that changes in details of structure may be made without departing from the spirit thereof.

What is claimed is:

1. In a method of making light transfer apparatus, the steps for making a screen row assembly comprising:
    applying an adhesive to selected surfaces of a plurality of screen units, said surfaces contacting when said units are side by side, said screen units having a fiber ribbon along one side and a spacer portion along an opposite side,
    placing said plurality of screen units side by side in a row with the side fiber ribbon of one abutting the spacer portion of another for adjacent screen units and face down on a bottom row clamp with an alignment rib between each adjacent screen unit,
    inserting at least one alignment rod through a transverse hole in each screen unit and through at least one first transverse hole in each alignment rib,
    placing a top row clamp on the row of said ribs and a pair of end row clamps at opposite ends of said bottom and top row clamps, and
    securing said row clamps together in an oblong configuration to provide a selected length dimension between said end row clamps for clamping said row of screen units together in a straight row and to a preselected row length dimension with substantially uniform spacing between the fiber ribbons in each screen unit and adjacent connected screen units to form a substantially straight screen row assembly.

2. In a method as set forth in claim 1 including the step of inserting a plurality of row alignment pins through holes a selected distance apart in the top row clamp into holes in the top of each associated rib for positioning and aligning said screen units in a straight row prior to said clamping.

3. In a method as set forth in claim 1 wherein said clamping of said top, bottom and end row clamps against said row of screen units is accomplished by inserting a clamping rod having threads on both end portions through holes in said ribs and said end caps and threading nuts on the threaded end portions to apply an inwardly directed clamping pressure to said end row clamps along said clamping rod.

4. In a method as set forth in claim 1 wherein the ends of said top row clamp and bottom row clamp abut against parallel spaced inside surfaces of said end row clamps, the length of said top and bottom row clamp being selected to provide the selected length dimension for said row of connected screen units.

5. A combination for making a light transfer apparatus having a screen row assembly, the combination comprising:
    a bottom row clamp on which a plurality of screen units are disposed face down and side by side in a row, said screen units having an adhesive applied to selected surfaces which contact one another when said units are side by side, said screen units having a fiber ribbon along one side and a spacer portion along an opposite side,
    an alignment rib between adjacent screen units,
    a top row clamp disposed on said ribs,
    a pair of end row clamps at opposite ends of said top and bottom row clamps,
    at least one alignment rod extending through a first transverse hole in each rib, and
    means for clamping said row clamps together in an oblong configuration with a preselected length dimension between said end row clamps thereby clamping said row of screen units together in a straight row to a selected length dimension with substantially uniform spacing between the fiber ribbons in each screen unit and adjacent connected screen units.

6. A combination as set forth in claim 5 wherein said top row clamp has a plurality of alignment holes in straight rows and at selected distances apart and alignment pins extend through said alignment holes and into top holes in said ribs as a preliminary alignment of said screen units in a row prior to clamping.

7. A combination as set forth in claim 5 wherein said end row clamps have inturned flanges to hold said top and bottom row clamps parallel, and said clamping means including a clamping rod extending through a second transverse hole in said ribs, and through holes in said end row clamps, said clamping rod having externally threaded end portions on which a nut is threaded to draw said end row caps toward one another.

8. A combination as set forth in claim 5 wherein there are two alignment rods, one of said alignment rods extends approximately midway between the top and bottom ends of each row of screen units and the other of said alignment rods extends adjacent the bottom end of each row of screen units.

9. A combination as set forth in claim 5 wherein each of said ribs has a generally U-shaped cross section having a top section and two parallel spaced leg sections, a portion of said screen units being removed to expose tubular end sections extending through said units and projecting from the sides of said units that insert into holes in said ribs to receive and support said ribs and connect said ribs to said row of units while providing uniform spacing between adjacent screen units, said alignment rod extending through said tubular sections of each row of said units.

10. In a method of making light transfer apparatus, the steps for making a matrix row assembly comprising:
    providing a row clamp assembly including a bottom wall portion, top wall portion with a top slot and oppositely disposed end wall portion defining a space of a preselected length dimension and of a generally oblong configuration, placing a first T-block in said top slot, and a first end cap in said space below said first T-block, said end cap having at least one vertical guide hole, securing a second T-block in the top slot in a loosely fastened manner to said top wall portion, positioning a plurality of matrix units side by side in said space in a row, there being an adhesive on the contacting side surfaces of said matrix units and end caps, positioning a third T-block in the top slot and a second end cap under said third T-block, and advancing a clamping block adjacent said third T-block in the space to a final clamping position and firmly fastening said second T-block in place to clamp the matrix units and end caps together to form a clamped straight matrix row assembly.

11. In a method as set forth in claim 10 including the step of curing the connected matrix units and removing the connected matrix units and connected end caps from the row clamp assembly.

12. In a method as set forth in claim 10 wherein said advancing of said clamping block is by threading a bolt through internal threads on one of said end wall portions.

13. In a method as set forth in claim 10 including the step of suspending the row clamp assembly from an elevated position.

14. In a method as set forth in claim 10 including the step of positioning of alternating ridges and grooves on said matrix units in alternating ridges and grooves in said bottom wall portion and said T-blocks to align the ends of said matrix units.

15. A combination for making a light transfer apparatus, the combination comprising:
    a row clamp assembly including a bottom wall portion, a top wall portion having a top slot, a pair of oppositely disposed end wall portions to form a space of a selected length dimension and of a generally oblong configuration, first, second and third T-blocks in said top slot above said space and arranged end to end on end cap in said space under each of said first and third T-blocks, a clamping block between one end wall portion and one end cap, and means to move said clamping block along said space to a selected position to provide a selected distance between said first and third T-blocks to clamp a plurality of matrix units disposed in said space side by side, said matrix units having an adhesive applied to selected contacting surfaces to connect said matrix units together and to said end caps to form a connected matrix unit row assembly.

16. A combination as set forth in claim 15 wherein said bottom wall portion is provided by a flat surfaced bottom plate, said top wall portion by a flat surfaced top plate and said end wall portions by end spacers block between said top and bottom plates.

17. A combination as set forth in claim 15 wherein said T-blocks are fastened to said top wall portions by bolts.

18. A combination as set forth in claim 15 wherein said clamping block is limited in movement by abutting the side of said T-blocks.

19. A combination as set forth in claim 15 wherein said T-blocks and said bottom wall portions have alternating grooves and ridges that mate with grooves and ridges in the top and bottom of said matrix units.

20. A combination method of making a light transfer apparatus comprising the steps of:
    providing a pair of supporting guide rails extending parallel to one another,
    positioning a plurality of aligned rows of screen units held in a row clamping assembly on a guide that locates the screen units in aligned columns and overlapping an end portion of one row of screen units with an adjacent end portion of the next row,
    interfitting end portion of ribs between each screen unit in each row with the end portion of an adjacent rib of the next row of screen units,
    connecting the abutting ribs end to end in a straight line,
    securing terminator bars at opposite ends of the columns of screen units,
    securing fastening brackets to the back of the aligned ribs,
    securing a top connector member across the top of said column of screen units,
    securing a bottom connector member across the bottom of said columns of screen units,
    connecting a pair of spaced side frame members and top and bottom frame members in an oblong configuration to form a screen frame,
    applying an adhesive to contacting surfaces of a plurality of rows of matrix unit assemblies,
    successively sliding a plurality of matrix unit row assemblies, having at least one vertical guide hole at opposite ends down over a pair of spaced upright guide rods, said guide rods extending up from opposite end portions of a first frame member to form a plurality of columns of matrix units, there being a pair of second frame members secured at the ends of said first frame member and outside and parallel to said guide rods,
    clamping a fourth frame member to the ends of said second frame members to form a matrix frame of an oblong configuration around said columns of matrix units,
    adding an auxiliary frame that extends beyond the ends of the formed assembly of units,
    mounting said matrix frame at the rear of the screen frame, and
    cutting across the face of the matrix ends and through the auxiliary frame to form a substantially planar matrix end surface.

21. A method as set forth in claim 20 wherein said overlapping portion of said rows of screen units have a rib on one row and a notch in the other row that interfit and are adhesively joined together.

22. A method as set forth in claim 20 including the fastening of said terminator bars to said support frame and the fastening of said fastening brackets to said support frame.

23. A method as set forth in claim 20 including the securing of a top frame plate to the top frame member and a bottom plate to the bottom frame member and the connection of cables between the top and bottom frame plates at the front and rear of said support frame.

24. A method as set forth in claim 20 including the connecting of two spaced horizontal intermediate frame members to the side frame members and the connecting of two spaced vertical intermediate frame members to the top and bottom frame members.

25. A method as set forth in claim 20 wherein said aligned ribs have a tongue at one end and a groove at the opposite end which interfit and said overlapping portions have a rib on each row and a slot on the adjacent row which interfit.

26. A method as set forth in claim 20 wherein said row clamping assembly includes a bottom row clamp, top row clamp and end row clamps and said top row and end row clamps are removed from said screen units prior to connecting said ribs end to end.

27. A method as set forth in claim 20 wherein said ribs are connected end to end by inserting an inverted connecting channel over said adjacent ribs and riveting said channels to said ribs.

28. In a method as set forth in claim 20 wherein a shorter channel connects only abutting ends to two adjacent ribs adjacent the ends of the columns and a longer channel connects all of the ribs in each column for the remaining intermediate ribs.

29. In a method as set forth in claim 20 wherein said matrix frame is adjustably movable to a selected distance from said screen frame.

30. Light transfer apparatus comprising:
a plurality of bundles of optical fibers extending between a screen and a matrix,
said optical fibers terminating at one end in a screen surface of a screen unit assembly including a plurality of screen units arranged in an array of rows and columns,
said optical fibers terminating at the other end in a matrix unit assembly including a plurality of matrix units aligned in an array of rows and columns,
a screen frame including a top frame member, bottom frame member and a pair of spaced side frame members interconnected together in an oblong configuration,
a matrix frame mounted to said screen frame,
each said row of screen units having an alignment rib connected between each screen unit, at least one alignment rod extending through each screen unit of each row, a terminator bar connected to said screen frame and connected at each end of each row of screen units to the ends of said alignment rods,
each said rib having male and female coupling portions at opposite ends so that the male and female connecting portions of adjacent ribs in each column interfit,
means connecting the ends of the interfitting aligned ribs together in straight columns, one row of screen units being in an overlapping relationship with the next lower row of screen units with the overlapping portions being connected together.

31. Light transfer apparatus as set forth in claim 30 wherein said screen frame has at least two spaced horizontal intermediate frame members between said top and bottom frame members and connected at the ends to said end frame member and at least two spaced vertical frame members between said side frame members and connected at the ends to said top and bottom frame member, a top frame plate connected to and extending across said top frame member and a bottom frame plate connected to and extending under said bottom frame member.

32. Light transfer apparatus as set forth in claim 30 wherein said male and female coupling portions are in the form of a tapered tongue and a tapered groove.

33. Light transfer apparatus as set forth in claim 30 including a top connector member connected to the screen frame and secured to connecting means and interconnected ribs across the top of the columns and bottom connector member connected to said screen frame and secured to the connecting means and interconnected ribs across the bottom of the columns to hold said columns vertical.

34. Light transfer apparatus as set forth in claim 30 wherein one of said overlapping portions has a rib and the other a groove that interfit with one another.

35. Light transfer apparatus as set forth in claim 30 including cables extending from the top to the bottom of said frame and through said ribs for added strength.

36. Light transfer apparatus as set forth in claim 30 wherein each rib is of a channel shape having a top section and a pair of spaced parallel end sections, said legs extending along and generally conforming to the shape of the back of each screen unit with said top section extending parallel to the face of the screen unit.

* * * * *